United States Patent [19]

Wilkinson

[11] Patent Number: 4,597,020
[45] Date of Patent: Jun. 24, 1986

[54] DIGITAL VIDEO TAPE RECORDER APPARATUS

[76] Inventor: James H. Wilkinson, 17 Hamble Dr., Heathlands, Tadley, Basingstoke, Hampshire, United Kingdom

[21] Appl. No.: 604,485

[22] Filed: Apr. 27, 1984

[30] Foreign Application Priority Data

May 11, 1983 [GB] United Kingdom ............... 8312955

[51] Int. Cl.$^4$ ............................................. H04N 5/782
[52] U.S. Cl. .................................. 360/33.1; 360/10.3; 360/32; 360/38.1; 371/2
[58] Field of Search ....................... 360/10.3, 32, 33.1, 360/38.1; 358/327, 312, 336, 340; 371/2

[56] References Cited

U.S. PATENT DOCUMENTS

| 4,224,642 | 9/1980 | Mawatari et al. | 360/32 |
| 4,277,807 | 7/1981 | Baldwin | 360/32 |
| 4,352,129 | 9/1982 | Baldwin | 360/32 |
| 4,467,373 | 8/1984 | Taylor et al. | 360/38.1 |
| 4,470,142 | 9/1984 | Ive | 371/2 |

OTHER PUBLICATIONS

Baldwin, "The Effect of Word Distribution on the Error Management of Digital Television Recorders", SMPTE Journal, Jun. 1983, pp. 642-645.

Primary Examiner—Donald McElheny, Jr.

[57] ABSTRACT

Digital video tape recorder apparatus comprises, at the recording side, a field store controlled by a programmable read-only memory to shuffle samples making up a digital television signal prior to recording, the shuffling alternating between a first and a second predetermined manner field by field of the television signal. At the reproducing side of the apparatus a reverse de-shuffling process is carried out.

5 Claims, 8 Drawing Figures

TIME →

DIGITAL VIDEO TAPE RECORDER APPARATUS

BACKGROUND OF THE INVENTION

1. Field of the Invention

This invention relates to digital video tape recorder (VTR) apparatus.

2. Description of the Prior Art

Sample shuffling has become a well-known technique for use in digital VTR apparatus as a method of reducing the adverse effects of tape drop-out on a reproduced television picture. In sample shuffling, the video samples corresponding to say a field of the television signal are not recorded in the sequence corresponding to the sample order in each horizontal scan line and the order of the horizontal scan lines, but are shuffled in some predetermined way prior to recording on the magnetic tape and are deshuffled after reproduction from the magnetic tape. This ensures that a group of error samples resulting, for example, from a drop-out, are distributed over some period, such as a field, of the reproduced television signal, and this substantially increases the possibility of being able to conceal the error samples using some interpolation process.

Although sample shuffling is effective in the case of drop-out, there are still two particular circumstances where one or more stationary noise bars or a stationary noise pattern may occur in a reproduced television picture. The first is where there is a longitudinal scratch on the magnetic tape, and the second is where the digital VTR apparatus is used in shuttle mode, that is, to reproduce at a forward or reverse speed in excess of the normal reproduction speed.

These problems will now be described in more detail with reference to FIGS. 1 to 6 of the accompanying drawings.

FIG. 1 shows diagrammatically skew tracks 1 on a magnetic tape 2. An integral number, which may be one, of the tracks 1 correspond to each field of the recorded television signal. In the present description it will be assumed that three tracks 1 correspond to each field. Moreover, it is assumed that the tape 2 has suffered a longitudinal scratch 3, such as may result, for example, from a burr on a tape guide in the tape transport mechanism. Finally, it will be assumed that the tracks 1 are scanned by a reproducing head 4 which scans each track 1 as indicated by the arrows 5.

FIG. 2 shows diagrammatically the result of the scratch 3 (FIG. 1) on a reproduced television picture 6, it being assumed that sample shuffling has not been used. Because three of the tracks 1 correspond to one field, and because the scratch 3 has corrupted or destroyed the recorded sample signals in corresponding regions of each track 1, the reproduced television picture 6 will have three noise bars 7. Any concealment process used will be ineffective in this situation, because concealment is necessarily effected by interpolation and this relies on the availability of uncorrupted samples adjacent to any error sample, adjacent in this case meaning adjacent in the same horizontal scan line or adjacent in an adjacent horizontal scan line or in a corresponding position in an adjacent field in the sequence of fields. Because the scratch 3 affects corresponding regions of each track 1, such adjacent uncorrupted samples will not be available in the case of many of the error samples resulting from the scratch 3.

FIG. 3 again shows diagrammatically the result of the scratch 3 (FIG. 1) on the reproduced television picture 6, but in this case it is assumed that sample shuffling has been used. As a consequence it is likely that some of the error samples will be concealed, but there will still remain a significant number that it is not possible to conceal, and these will result in a stationary noise pattern 8 on the reproduced television picture 6.

Similar problems arise in the shuttle mode. Thus, as indicated diagrammatically in FIG. 4, if the recorded signal is being reproduced at high speed, the reproducing head 4 will trace a path 9 which crosses the tracks 1. In consequence, the envelope of the radio frequency reproduced signal will be generally as indicated in the graph of FIG. 5, with the amplitude of the reproduced signal rising from a minimum 10 to a maximum 11 as the reproducing head 4 moves from the edge to the centre of a track 1, and vice versa.

As indicated diagrammatically in FIG. 6, the effect of this on the reproduced television picture 6 is that there are $3n$ noise bars 12, where n is the multiple by which the reproduction speed deviates from the normal reproduction speed. Concealment is wholly ineffective in such a case, simply because the density of error samples is too large for any effective interpolation.

SUMMARY OF THE INVENTION

One object of the present invention is to provide a digital VTR apparatus in which these problems are reduced.

Another object of the present invention is to provide a digital VTR apparatus in which noise bars or noise patterns in a picture reproduced from a damaged magnetic tape or in a shuttle mode are reduced.

Another object of the present invention is to provide a digital VTR apparatus in which noise bars or noise patterns which occur at similar locations in sequential fields are reduced by sample shuffling in different predetermined manners in alternating periods of the television signal.

According to the present invention there is provided digital video tape recorder apparatus comprising sample shuffling means for shuffling the samples making up a digital television signal prior to recording of said samples and for de-shuffling said samples subsequent to reproduction, said sample shuffling means operating to shuffle said samples to be recorded in a first predetermined manner for a first period of said television signal and in a second predetermined manner, different from said first predetermined manner, for a second period, equal to said first period, of said television signal.

The number of said predetermined manners is not restricted to two, although two is a convenient number. Preferably the first and second periods are each a field or a frame of the television signal, although they may be of some other duration.

The above, and other objects, features and advantages of this invention will be apparent from the following detailed description of illustrative embodiments which is to be read in connection with the accompanying drawings.

DESCRIPTION OF THE PREFERRED EMBODIMENTS

The embodiment to be described is a digital VTR apparatus having provision for shuffling the samples making up a digital television signal prior to recording and for de-shuffling the samples after reproduction, but with the feature that the shuffling is done in two different predetermined manners which alternate field by field.

Figure 1:
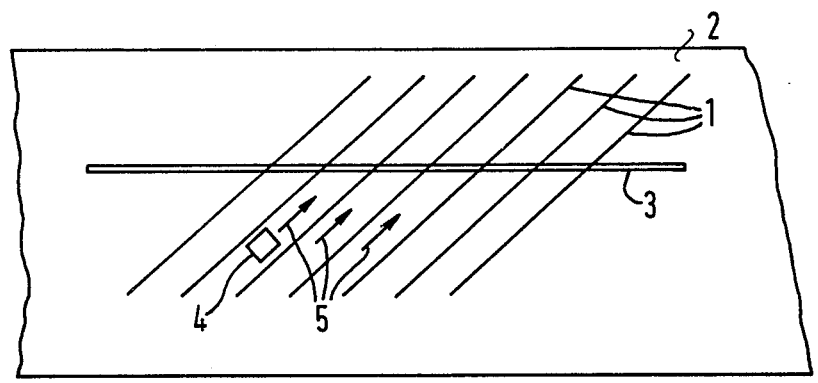
FIG. 1 shows diagrammatically skew tracks on a magnetic tape.
Figure 2:
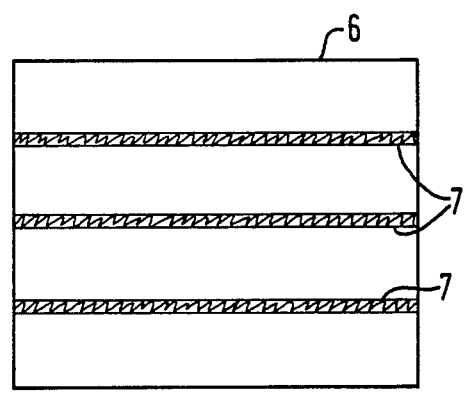
FIG. 2 shows diagrammatically noise bars on a reproduced television picture.
Figure 3:
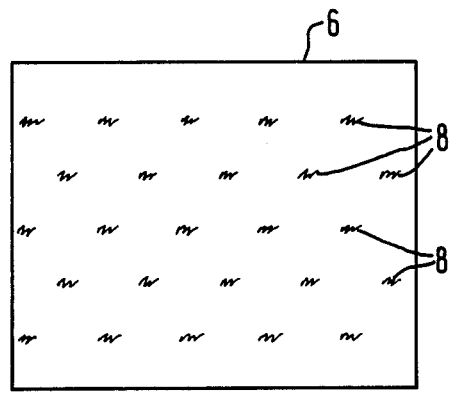
FIG. 3 shows diagrammatically a noise pattern on a reproduced television picture.
Figure 4:
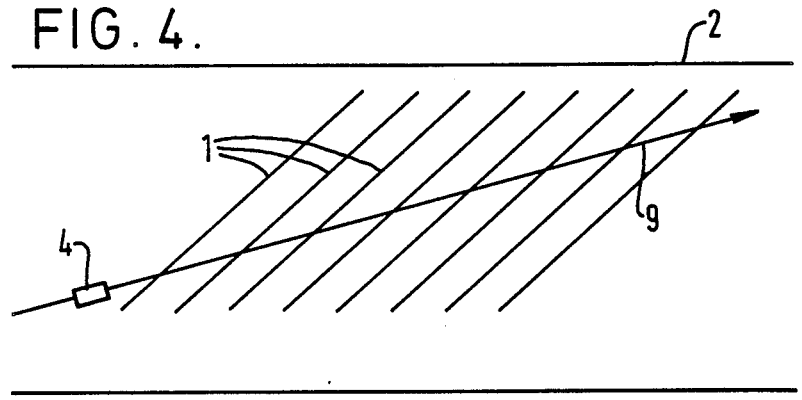
FIG. 4 shows diagrammatically the reproduction of skew tracks on a magnetic tape.
Figure 5:
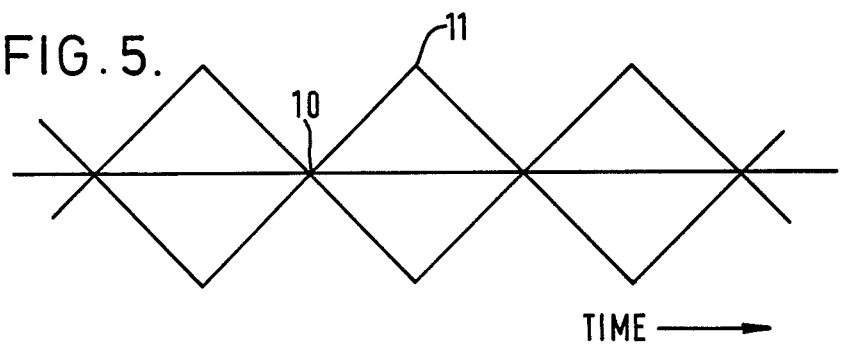
FIG. 5 shows the radio frequency envelope of a reproduced television signal.
Figure 6:
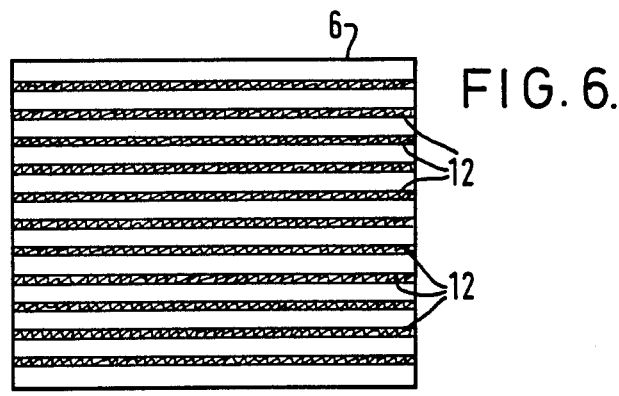
FIG. 6 shows diagrammatically noise bars on a reproduced television picture.
Figure 7:
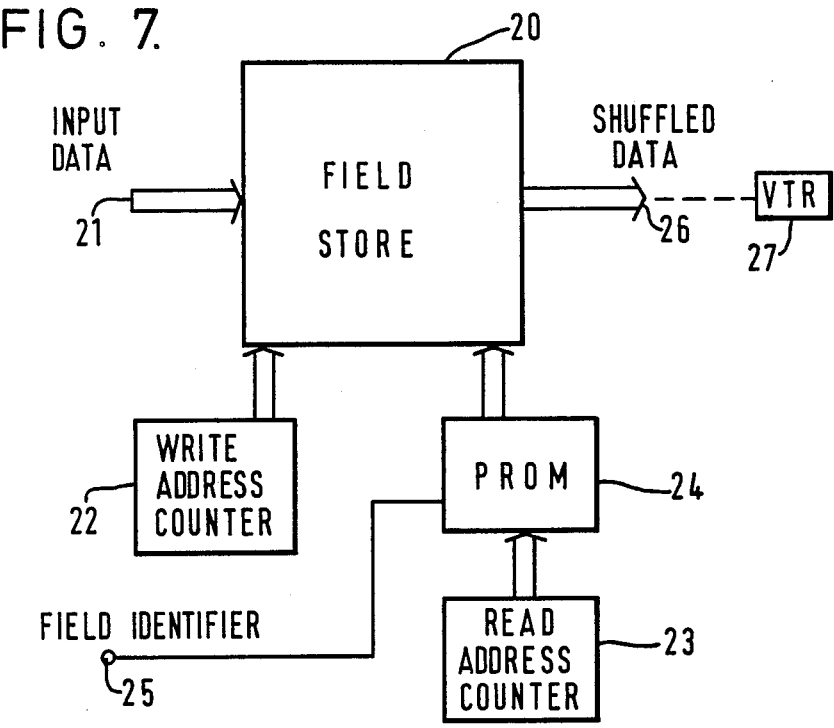
FIG. 7 shows in block form part of an embodiment of digital VTR apparatus according to the invention.

Referring to FIG. 7, this shows the shuffling arrangement at the recording side of the apparatus. The shuffling arrangement comprises a field store 20 into which input data in the form of pulse code modulated binary samples of a television signal to be recorded are supplied by way of an input 21, to be written in the field store 20 under the control of a write address counter 22. Read out is under control of a read address counter 23, which will in fact generally comprise the combination of a sample counter and a line counter, but the read address signals pass by way of a programmable read-only memory (PROM) 24 to the field store 20. A field identifier signal indicating whether the field currently being supplied to the field store 20 is the first or the second field of a frame is supplied by way of an input 25 to the PROM 24. The PROM 24 operates to read the stored binary samples in either a first or a second different predetermined manner from the field store 20 so as to result in the data supplied to an output 26 and thence to a VTR 27 being shuffled in either a first or a second predetermined manner in respective first and second fields of each frame. The shuffled data so produced is then recorded in skewed tracks on a magnetic tape (not shown) in the usual way.

Figure 8:
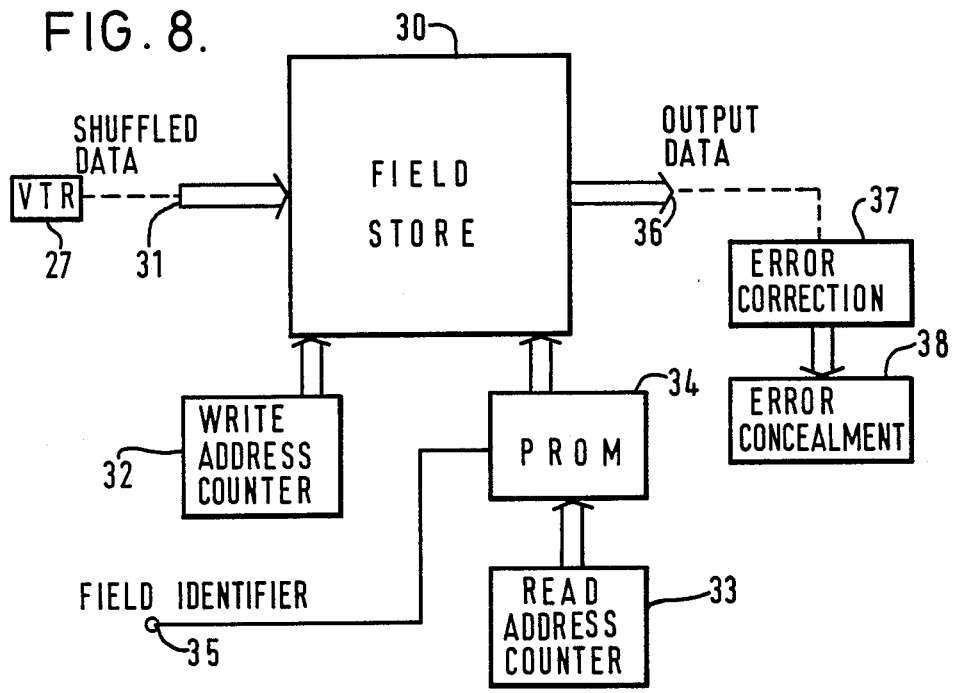
FIG. 8 shows in block form another part of the embodiment of FIG. 7.

FIG. 8, to which reference is now made, shows the de-shuffling arrangement at the reproducing side of the VTR 27. The de-shuffling arrangement comprises a field store 30, which may, for example, form part of a time base corrector at the reproducing side of the apparatus, to which the shuffled data reproduced from the magnetic tape (not shown) is supplied by way of an input 31. The shuffled data is written into the field store 30 under control of a write address counter 32. Read out is under control of a read address counter 33, from which the read addresses are supplied to the field store 30 by way of a PROM 34, which is generally similar to the PROM 24 at the recording side and which operates in the inverse manner so as to effect de-shuffling of the stored binary samples. The predetermined manner in which the de-shuffling is done is controlled in synchronism with the shuffling by supplying a field identifier signal derived from the input data by way of an input 35 to the PROM 34. The de-shuffled output data is supplied to an output 36 for subsequent processing, in particular error correction in a correction device 37 and error concealment in a concealment device 38.

The effect of the alternation of the shuffling process is very substantially to increase the effectiveness of the subsequent concealment. Thus because the shuffling is not always done in the same predetermined manner, there is a substantially increased possibility that any error sample in the reproduced signal will have adjacent uncorrupted sample values, most especially those in corresponding positions in adjacent fields in the sequence of fields of the recorded television signal, so that the possibility of effective concealment, particularly temporal concealment, is much increased.

Various modifications are of course possible. For example, considering FIG. 7, although it was assumed above that the input binary samples are always written in the same predetermined positions in the field store 20 under control of the write address counter 22, and that the shuffling is effected by the PROM 24 on read out, this process can be reversed. In other words, the PROM 24 can be associated with the writing process so that the input binary samples are shuffled on being written into the field store 20. Similar changes can also be applied to the write in and read out on the reproduction side of the apparatus shown in FIG. 8.

Also, although it has been assumed in the above description that the stores 20 and 30 are both field stores, this is not necessarily the case, and they can for example be frame stores. Although it has been assumed that the shuffling alternates field by field between two different predetermined manners, it can in fact cycle around three or more different predetermined manners. Also, the interval need not be a field but may for example be a frame or a plurality of fields or frames, or even a fraction of a field. In these cases it will be necessary to replace the field identifier signal referred to above by the appropriate interval identifier signal, to ensure that the PROM 34 (FIG. 8) at the reproducing side of the apparatus operates in synchronism with the PROM 24 (FIG. 7) at the recording side of the apparatus.

The number of predetermined manners of shuffling and the intervals over which the shuffling is done will be determined in dependence on the precise method of concealment which is to be used, so as to enhance the concealment.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A digital video tape recorder apparatus comprising sample shuffling means for shuffling the samples making up a digital television signal prior to recording of said samples and for de-shuffling said samples subsequent to reproduction, said sample shuffling means operating to shuffle said samples to be recorded in a first predetermined manner for a first period of said television signal and in a second predetermined manner, different from said first predetermined manner, for a second period, equal to said first period, of said television signal.

2. Apparatus according to claim 1 wherein said shuffling alternates between said first predetermined manner and said second predetermined manner field by field of said television signal to be recorded.

3. Apparatus according to claim 1 comprising, at the recording side of the apparatus, a first field store into which said samples to be recorded are written or from which said samples to be recorded are read under control of a first programmable read-only memory which effects said shuffling.

4. Apparatus according to claim 3 comprising, at the reproducing side of the apparatus, a second field store into which said shuffled samples are written or from which said samples are read under control of a second programmable read only memory which effects de-shuffling to reverse the shuffling effected by said first programmable read-only memory.

5. Apparatus according to claim 1 comprising a video tape recorder for recording said television signal in skew tracks of a magnetic tape, an integral number of said tracks being used to record each field of said television signal.

* * * * *